April 28, 1942.  C. F. G. KJELLBERG  2,281,506
INTERNAL COMBUSTION ENGINE
Filed April 15, 1940   2 Sheets-Sheet 1
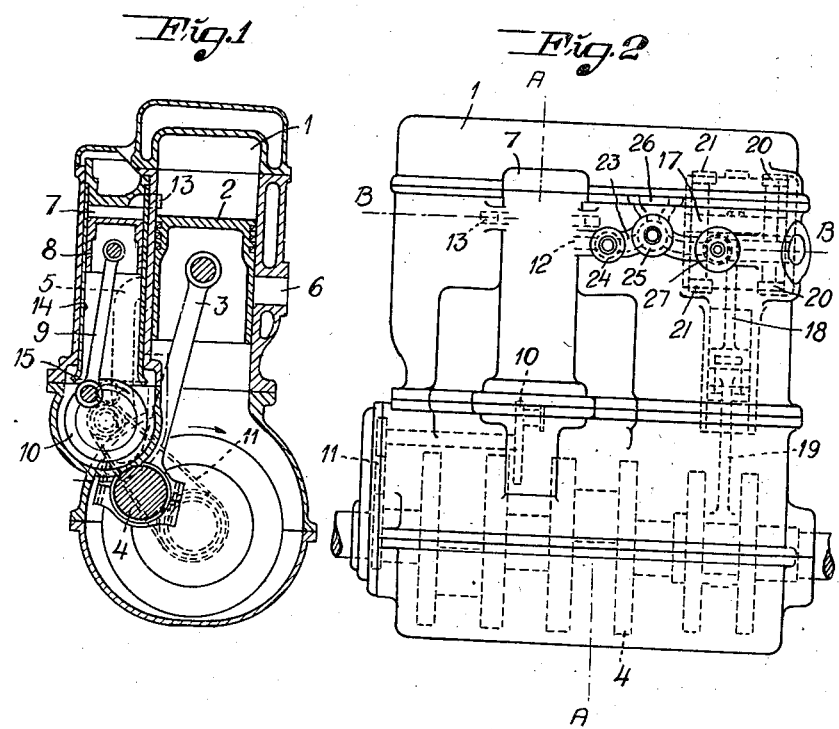
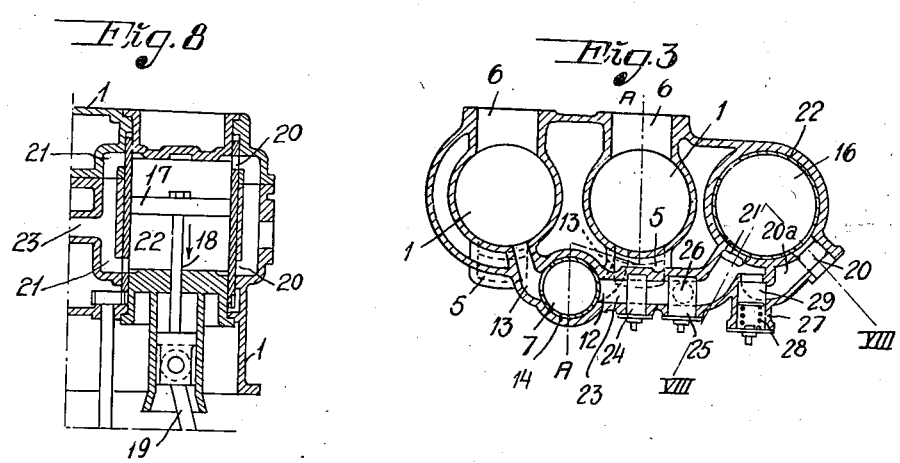
Inventor
C. F. G. Kjellberg
By: Glascock Downing & Seebold
Attys.

April 28, 1942.    C. F. G. KJELLBERG    2,281,506
INTERNAL COMBUSTION ENGINE
Filed April 15, 1940    2 Sheets-Sheet 2
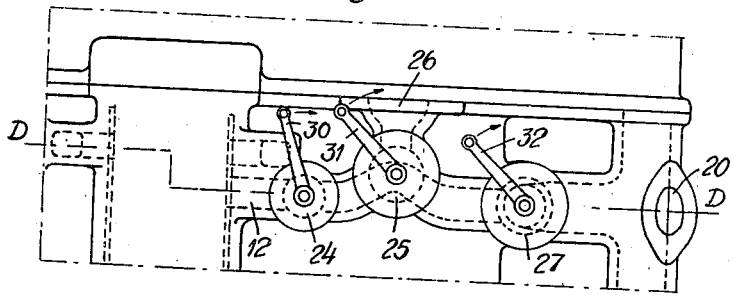
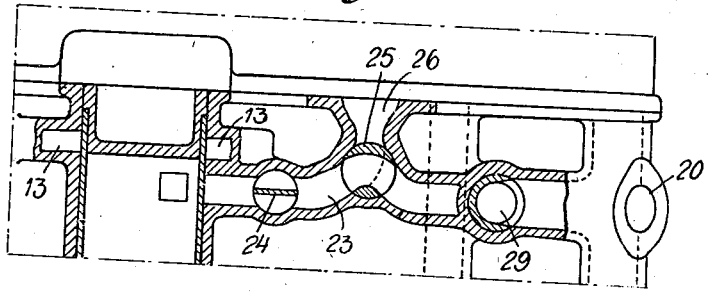
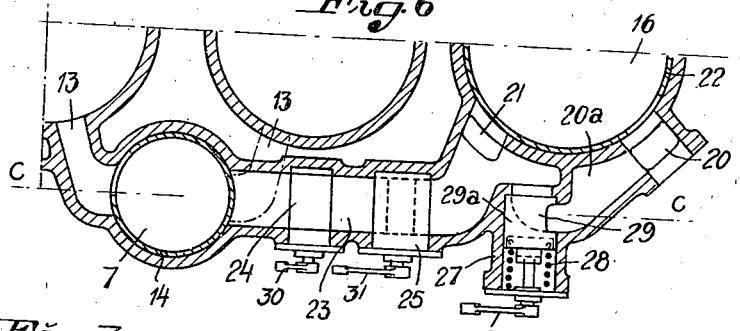
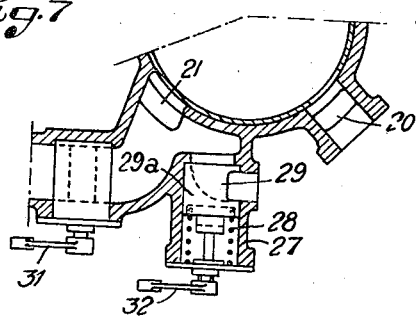

Patented Apr. 28, 1942

2,281,506

UNITED STATES PATENT OFFICE 2,281,506

INTERNAL COMBUSTION ENGINE

Carl Fredrik Gunnar Kjellberg, Stockholm, Sweden

Application April 15, 1940, Serial No. 329,815
In Sweden November 11, 1938

9 Claims. (Cl. 123—59)

The present invention relates to internal combustion engines and more particularly to means for varying the degree of admission of internal combustion engines having at least one working cylinder provided with a piston and connected to a reciprocating charging pump for supplying a charge to the working cylinder during the compression stroke thereof.

The invention has for its primary object to provide for an arrangement combining a charging pump connected to a working cylinder and adapted to supply thereto an additional charge during the compression stroke with a precharging pump having a larger volume than the charging pump and being adapted to increase the quantity normally supplied by the last-named pump. A further object of the invention is to provide means for controlling the additional charge or the pressure set up in the charging pump by means of the precharging pump between the maximum pressure and atmospheric pressure, in which latter case the precharging pump will not increase the charge delivered by the charging pump. A further control of the degree of admission may be effected by means of a throttle valve. A pressure-controlled valve device may be provided for limiting the maximum pressure in the charging pump when the precharging pump is operated to increase the pressure of the charge supplied to the charging pump. Moreover, a three-way valve may be provided for connecting the inlet of the charging pump with the atmosphere, with a carburettor for liquid fuel or the like, in which case the connection with the precharging pump is interrupted.

The construction according to the invention thus renders possible an increase of the degree of admission beyond the normal admission and a control of the said degree to obtain an admission above or below the normal value. The invention may, for instance, be applied to oil operated aircraft engines in which the charge almost exclusively consists of air and may be said to be normal at normal atmospheric pressure and near the sea level, whereas at great altitudes the charge must be considerably increased, in order that the engine be able to produce the same output as with the atmospheric pressure near the sea level. A further field of application for the invention is represented by gas driven engines. If gas produced from wood or charcoal is used as a driving fuel, the charge consists to a material extent of gas, namely, between 30 and 50 per cent of the filling in the motor cylinder. The ratio of the gas quantity to the air quantity and the compression ratio which normally lies between 1:7 and 1:8 must be varied in response to the specific heat-content in the gas in such a manner that with gas of low heat-content the quantity of gas supplied to the cylinder as well as the compression in the cylinder will be greater than with a gas of great heat-content, so as to obtain the same output in both cases.

An embodiment of the invention is shown in the annexed drawings which illustrates a precharging pump connected to a charging pump for supplying motive fluid to a two-cylinder two-stroke internal combustion engine. In the drawings:

Fig. 1 is a section through a working cylinder and the charging pump on the broken line A—A, Figs. 2 and 3;

Fig. 2 is an elevation of the entire engine aggregate as viewed from the left of Fig. 1;

Fig. 3 is a section taken on the broken line B—B, Fig. 2;

Fig. 4 is an enlarged view of a portion of Fig. 3, showing various passages, control and operating members;

Fig. 5 is a section taken on line C—C, Fig. 6;

Fig. 6 is a section taken on the broken line D—D, Fig. 4, and showing a control system for gas driven engines;

Fig. 7 is a section of a modification of the control system adapted to be used in oil driven aircraft engines; and Fig. 8 is a section of the precharging pump taken on the broken line VIII—VIII of Fig. 3.

Referring to the drawings, the engine comprises two working cylinders 1, each provided with a piston 2 and a connecting rod 3 pivoted to the crank shaft 4. In the present embodiment, the working cylinders 1 are arranged to be scavenged from the crank case through separate scavenging passages 5. The exhaust gases are discharged through openings 6. Each working cylinder 1 is supplied, during the compression stroke, with a charge from a single-acting charging pump 7 provided with a reciprocating piston 8 and a connecting rod 9 which is driven by a crank shaft 10. The crank shaft 10 is driven by the engine shaft 4 and is connected thereto by chain drive 11 constructed to operate at a speed ratio of 1 to 2. The number of strokes of the piston 8 of the charging pump is thus twice the number of strokes of the pistons of the working cylinders. The cylinder of the charging pump is provided with an inlet 12 and outlets 13 which are controlled by a rotary slide valve 14 which is operated from the crank shaft 10 of the charging pump 7 by means of a bevel gearing 15. The outlets 13 are connected to the respective working cylinder 1. In the embodiment shown, there is provided a double-acting precharging pump 16 having a piston 17, piston rod 18 and connecting rod 19 actuated by the engine shaft 4. The cylinder of the precharging pump 16 is provided at both ends with inlets 20 and outlets 21 adapted to be connected with each other by passage 20a and controlled by a rotary sleeve valve 22 adapted to be operated by the engine shaft 4. The outlet 21 of the precharging pump 16 is connected with the inlet 12 of the charging pump 7 by means of a passage 23. Near the charging pump 7, the passage 23 is fitted with a throttle valve 24. The passage 23 is further provided with a two-way valve 25 which in the position shown in the drawings connects the inlet 12 of the charging pump with the outlet 21 of the precharging pump 16, while in its other end position the valve 25 connects the inlet of the charging pump with a passage 26 which may communicate with a carburettor for liquid fuel or any other suitable source of fuel. Between the outlet 21 and the inlet 20 of the precharging pump 16 there is provided a valve device 27 forming a passage 29 which may be wholly opened or closed or adjusted so as to provide any desired cross-sectional area between the opened and closed position (Fig. 6). In certain cases, especially in engines for aircraft, the valve device 27 is preferably directly connected to the atmosphere, as shown in Fig. 7. The valve device 27 is in the form of a pressure reducing valve adapted to reduce high pressures which may arise in the passage 23 between the precharging pump 16 and the charging pump 7, especially if the throttle valve 24 is closed. To this end, the valve device 27 comprises a valve member 29a axially displaceable against the action of a helical spring 28 and adapted to be turned by means of an operating arm 32. Also the valves 24 and 25 are provided with operating arms 30 and 31, respectively.

As shown in Fig. 1, the engine shaft 4 as well as the crank shaft 10 of the charging pump 7 are rotating in a clockwise direction, as indicated by the arrows, and the working piston 2 is moving upwards during compression. At the same time, the piston 8 of the charging pump is moved upwards under compression, whereby a charge is supplied through the rotary valve 14 and the passage 13 into one of the working cylinders 1. As shown in Fig. 3, the inlet 12 of the charging pump 7 is closed at that time by the rotary valve 14. The piston 17 of the precharging pump 16 is moving downwards. When the sleeve valve 22 uncovers the respective openings 20 and 21, the upper side of the piston 17 will exert suction through the inlet 20 and the lower side of the piston will exert pressure through the outlet 21. The three-way valve 25 is in the position shown in the drawings so as to connect the precharging pump through the passage 23 with the charging pump 7, the passage 26 being closed. The passage 23 is connected through the valve device 27 and the passage 20a with the inlet 20 of the precharging pump 16, as shown in Fig. 6.

Upon further rotation of the engine shaft 4 in the direction of the arrow the charging pump 7 ends the charging stroke before the working piston 2 has entirely covered the passage 13 or has completed its compression stroke. When the piston 8 of the charging pump begins to move downwards, the passage 13 is closed and the inlet 12 of the charging pump is opened by the slide valve 14 so that a charge is drawn in by the piston of the charging pump. During the next compression stroke, the charge is supplied through the other passage 13 into the other working cylinder 1. During this time, the piston 17 of the precharging pump 16 has proceeded its downward movement and is supplying a charge to the charging pump 7 during each stroke of the piston 17. The engine shaft 4 and crank shaft 10 are so timed relative to each other that each stroke of the piston 17 of the precharging pump ends at the same time or substantially at the same time as the suction stroke of the piston 8 of the charging pump 7. At the same time, the suction stroke comes to an end on the opposite side of the piston 17 so that during the next upward movement a charge will be supplied to the charging pump 7 through the passage 23.

In the position shown in Fig. 6, the connection between the outlet 21 and the inlet 20 of the precharging pump 16 is entirely open through the passage 29 of the valve member 29a. In this case, the charging pump 7 is thus supplied with charge under atmospheric pressure and will thus draw in a quantity corresponding to the full volume of its cylinder. Even if the throttle valve 24 is in any intermediate position, no pressure is set up in the passage 23, since the quantity of charge supplied by the precharging pump 16 and not admitted to the charging pump 7 will be discharged through the passage 29. If, however, the valve member 29a is turned so as entirely to close the connection between the outlet 21 and the inlet 20, a superatmospheric pressure, which, disregarding the volume of the passage 23 and the clearances of the pumps, corresponds to the difference between the cylinder volumes of the pumps 16 and 7, will be set up in the charging pump 7. In this case, the maximum volume will be supplied to the working cylinder 1, said maximum volume being determined by the volume of the precharging cylinder. If the throttle valve 24 is closed to reduce the supply to the charging pump 7, a superatmospheric pressure will be set up in the precharging pump 16 and the passage 23, which pressure increases the work for the pump 16 and reduces the output of the engine. However, this pressure cannot exceed a certain predetermined value. When the pressure reaches this value, the valve member 29a will be moved axially outwards against the action of the spring 28 so as to open the connection between the outlet 21 and the inlet 20. The throttle valve 24 may be connected to the valve device 27 in a manner such that the last-named valve device will be gradually opened as the throttle valve is moved towards closed position.

If the construction according to the invention is to be applied to aircraft engines or to engines supercharged with air only, the passage 29 of the valve member 29a and the inlet 20 of the precharging pump 16 are connected to the atmosphere, as shown in the modification according to Fig. 7. In gas driven engines, the inlet 20 of the precharging pump 16 is connected to a gas generator, and means may be provided for supplying additional air to the precharging pump.

If the engine is to be operated without precharging pump, for instance with liquid fuel, the valve 25 is shifted, so that the passage 23 will be connected with the passage 26 which may be connected to a carburettor or to a fuel pump.

The arrangement described may be modified in various respects without departing from the scope of the invention. For instance, the working cylinders and the pumps may be provided with other control valves than those exemplified in the drawings.

What I claim is:

1. In an internal combustion engine, a working cylinder, a working piston arranged in reciprocate in said cylinder, an engine shaft operatively connected to said piston, a charging pump having an inlet and an outlet and including a reciprocating piston operatively connected to said engine shaft, means responsive to the angular position of said engine shaft for connecting the outlet of said charging pump with said working cylinder during the compression stroke thereof and for completing the charging stroke of said charging pump before said working piston has completed its compression stroke, a precharging pump having an inlet and an outlet and including a reciprocating piston operatively connected to said engine shaft, a passage for connecting the outlet of said precharging pump with the inlet of said charging pump, and means for timing the reciprocating movements of said pistons so as to complete the compression stroke of said precharging pump and the suction stroke of said charging pump substantially at the same time and a valve device in said passage for controlling the outlet of said precharging pump and the inlet of said charging pump for supplying a charge from said precharging pump as an additional filling into said working cylinder.

2. In an internal combustion engine, a working cylinder, a working piston arranged to reciprocate in said cylinder, an engine shaft operatively connected to said piston, a charging pump having an inlet and an outlet and including a reciprocating piston operatively connected to said engine shaft, means responsive to the angular position of said engine shaft for connecting the outlet of said charging pump with said working cylinder during the compression stroke thereof and for completing the charging stroke of said charging pump before said working piston has completed its compression stroke, a precharging pump having an inlet and an outlet and including a reciprocating piston operatively connected to said engine shaft, a passage for connecting the outlet of said precharging pump with the inlet of said charging pump, means for timing the reciprocating movements of said pistons so as to complete the compression stroke of said precharging pump and the suction stroke of said charging pump substantially at the same time, and a control valve device in said passage, said valve device being constructed and arranged to connect the outlet of said precharging pump with the inlet of said precharging pump and to vary the cross-sectional area for flow of charge from the outlet to the inlet of said precharging pump.

3. In an internal combustion engine, a working cylinder, a working piston arranged to reciprocate in said cylinder, an engine shaft operatively connected to said piston, a charging pump having an inlet and an outlet and including a reciprocating piston operatively connected to said engine shaft, means responsive to the angular position of said engine shaft for connecting the outlet of said charging pump with said working cylinder during the compression stroke thereof and for completing the charging stroke of said charging pump before said working piston has completed its compression stroke, a precharging pump having an inlet and an outlet and including a reciprocating piston operatively connected to said engine shaft, a passage for connecting the outlet of said precharging pump with the inlet of said charging pump, means for timing the reciprocating movements of said pistons so as to complete the compression stroke of said precharging pump and the suction stroke of said charging pump substantially at the same time, and a control valve device in said passage, said valve device being constructed and arranged to connect the outlet of said precharging pump with the atmosphere and to vary the cross-sectional area for flow of charge from the outlet of said precharging pump to the atmosphere.

4. In an internal combustion engine, a working cylinder, a working piston arranged to reciprocate in said cylinder, an engine shaft operatively connected to said piston, a charging pump having an inlet and an outlet and including a reciprocating piston operatively connected to said engine shaft, means responsive to the angular position of said engine shaft for connecting the outlet of said charging pump with said working cylinder during the compression stroke thereof, a precharging pump having an inlet and an outlet and including a reciprocating piston operatively connected to said engine shaft, a passage for connecting the outlet of said precharging pump with the inlet of said charging pump, means for timing the reciprocating movements of said pistons so as to complete the compression stroke of said precharging pump and the suction stroke of said charging pump substantially at the same time, and a spring actuated valve device in said passage, said valve device being constructed and arranged to connect the outlet of said precharging pump with the inlet of said precharging pump in response to a predetermined increase of pressure in said passage.

5. In an internal combustion engine, a working cylinder, a working piston arranged to reciprocate in said cylinder, an engine shaft operatively connected to said piston, a charging pump having an inlet and an outlet and including a reciprocating piston operatively connected to said engine shaft, means responsive to the angular position of said engine shaft for connecting the outlet of said charging pump with said working cylinder during the compression stroke thereof, a precharging pump having an inlet and an outlet and including a reciprocating piston operatively connected to said engine shaft, a passage for connecting the outlet of said precharging pump with the inlet of said charging pump, means for timing the reciprocating movements of said pistons so as to complete the compression stroke of said precharging pump and the suction stroke of said charging pump substantially at the same time, and a spring actuated valve device in said passage, said valve device being constructed and arranged to connect the outlet of said precharging pump with the atmosphere in response to a predetermined increase of pressure in said passage.

6. In an internal combustion engine, a working cylinder, a working piston arranged to reciprocate in said cylinder, an engine shaft operatively connected to said piston, a charging pump having an inlet and an outlet and including a reciprocating piston operatively connected to said engine shaft, means responsive to the angular position of said engine shaft for connecting the outlet of said charging pump with said working cylinder during the compression stroke thereof, a precharging pump having an inlet and an outlet and including a reciprocating piston operatively connected to said engine shaft, a passage for connecting the outlet of said precharging pump with the inlet of said charging pump, means for timing the reciprocating movements of said pistons so as to complete the compression stroke of said precharging pump and the suction stroke of said charging pump substantially at the same time, and a throttle valve in said passage arranged to control the ratio between the amount of charge supplied by said precharging pump and the amount of charge admitted to said charging pump.

7. In an internal combustion engine, a working cylinder, a working piston arranged to reciprocate in said cylinder, an engine shaft operatively connected to said piston, a charging pump having an inlet and an outlet and including a reciprocating piston operatively connected to said engine shaft, means responsive to the angular position of said engine shaft for connecting the outlet of said charging pump with said working cylinder during the compression stroke thereof, a precharging pump having an inlet and an outlet and including a reciprocating piston operatively connected to said engine shaft, a passage for connecting the outlet of said precharging pump with the inlet of said charging pump, means for timing the reciprocating movements of said pistons so as to complete the compression stroke of said precharging pump and the suction stroke of said charging pump substantially at the same time, and a control valve device in said passage, said valve device being constructed and arranged to connect the outlet of said precharging pump with the inlet of said precharging pump and to vary the cross-sectional area for flow of charge from the outlet to the inlet of said precharging pump, said valve device comprising a valve member and a spring member, said valve member being arranged to be turned about its axis and to be axially displaced against the action of said spring member in response to a predetermined increase of pressure in said passage.

8. In an internal combustion engine, a working cylinder, a working piston arranged to reciprocate in said cylinder, an engine shaft operatively connected to said piston, a charging pump having an inlet and an outlet and including a reciprocating piston operatively connected to said engine shaft, means responsive to the angular position of said engine shaft for connecting the outlet of said charging pump with said working cylinder during the compression stroke thereof, a precharging pump having an inlet and an outlet and including a reciprocating piston operatively connected to said engine shaft, a passage for connecting the outlet of said precharging pump with the inlet of said charging pump, means for timing the reciprocating movements of said pistons so as to complete the compression stroke of said precharging pump and the suction stroke of said charging pump substantially at the same time, and a control valve device in said passage, said valve device being constructed and arranged to connect the outlet of said precharging pump with the atmosphere and to vary the cross-sectional area for flow of charge from the outlet of said precharging pump to the atmosphere, said valve device comprising a valve member and a spring member, said valve member being arranged to be turned about its axis and to be axially displaced against the action of said spring member in response to a predetermined increase of pressure in said passage.

9. In an internal combustion engine, a working cylinder, a working piston arranged to reciprocate in said cylinder, an engine shaft operatively connected to said piston, a charging pump having an inlet and an outlet and including a reciprocating piston operatively connected to said engine shaft, means responsive to the angular position of said engine shaft for connecting the outlet of said charging pump with said working cylinder during the compression stroke thereof, a precharging pump having an inlet and an outlet and including a reciprocating piston operatively connected to said engine shaft, a passage for connecting the outlet of said precharging pump with the inlet of said charging pump, means for timing the reciprocating movements of said pistons so as to complete the compression stroke of said precharging pump and the suction stroke of said charging pump substantially at the same time, a throttle valve in said passage, a three-way valve in said passage between the outlet of said precharging pump and said throttle valve, and a conduit for supplying fuel to said charging pump, said three-way valve being arranged to connect the inlet of said charging pump either with the outlet of said precharging pump or with said conduit.

CARL FREDRIK GUNNAR KJELLBERG.